United States Patent [19]

Takeuchi

[11] 4,455,862  
[45] Jun. 26, 1984

[54] METHOD AND APPARATUS OF DETECTING ENGINE KNOCKING

[75] Inventor: Kiyoshi Takeuchi, Yokosuka, Japan

[73] Assignee: Nissan Motor Company, Limited, Yokohama, Japan

[21] Appl. No.: 370,822

[22] Filed: Apr. 22, 1982

[30] Foreign Application Priority Data

Apr. 27, 1981 [JP] Japan ............................ 56-63671

[51] Int. Cl.³ ........................................... G01L 23/22
[52] U.S. Cl. ........................................................... 73/35
[58] Field of Search ...................... 73/35; 123/425, 435

[56] References Cited

U.S. PATENT DOCUMENTS

| 3,247,705 | 4/1966 | Wostl | 73/35 |
| 4,111,065 | 9/1978 | West | 73/35 |
| 4,279,143 | 7/1981 | Guipaud | 73/35 |
| 4,346,586 | 8/1982 | Furrey | 73/35 |
| 4,384,473 | 5/1983 | Brandt | 73/35 |

FOREIGN PATENT DOCUMENTS

| 2918420 | 11/1980 | Fed. Rep. of Germany . | |
| 2063377 | 6/1971 | France . | |
| 55-156262 | 12/1980 | Japan | 73/35 |
| 2053348 | 2/1981 | United Kingdom . | |
| 2053351 | 2/1981 | United Kingdom . | |
| WO82/352 | 2/1982 | PCT Int'l Appl. . | |

*Primary Examiner*—James J. Gill  
*Attorney, Agent, or Firm*—Lane, Aitken & Kananen

[57] ABSTRACT

An engine knocking detection method and apparatus which can accurately separate engine knocking vibration signals from background noise signals on the basis of the waveforms of the detected engine vibration signals. Usually, engine knocking vibration signals have frequency components of from 6 to 9 KHz and envelope time constants of from 1.5 to 50 ms. Therefore, the engine knocking detection apparatus according to the present invention comprises a band-pass filter (6-9 KHz), a first smoothing circuit which outputs only engine vibration signals with envelope time constants of 1.5 ms or more and a second smoothing circuit which outputs only background noise signals with time constants of 50 ms or more, in addition to a vibration sensor, amplifiers, a rectifier, and a comparator.

7 Claims, 29 Drawing Figures

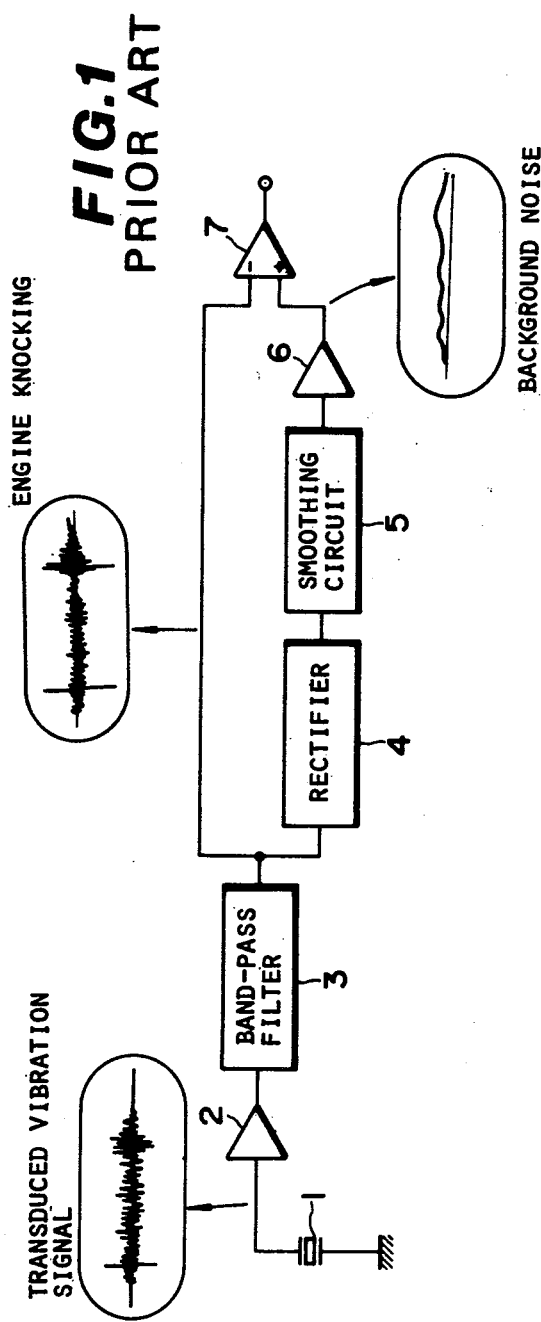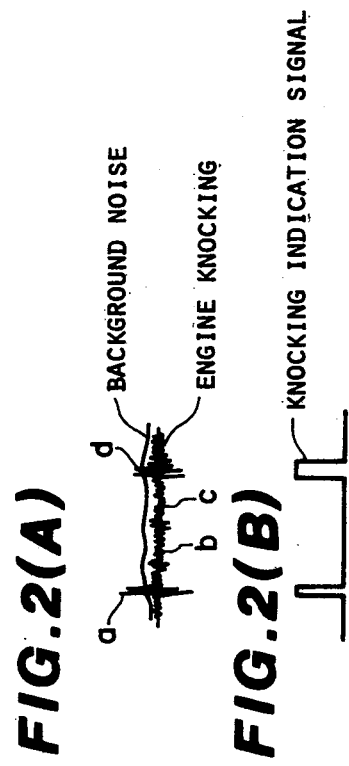

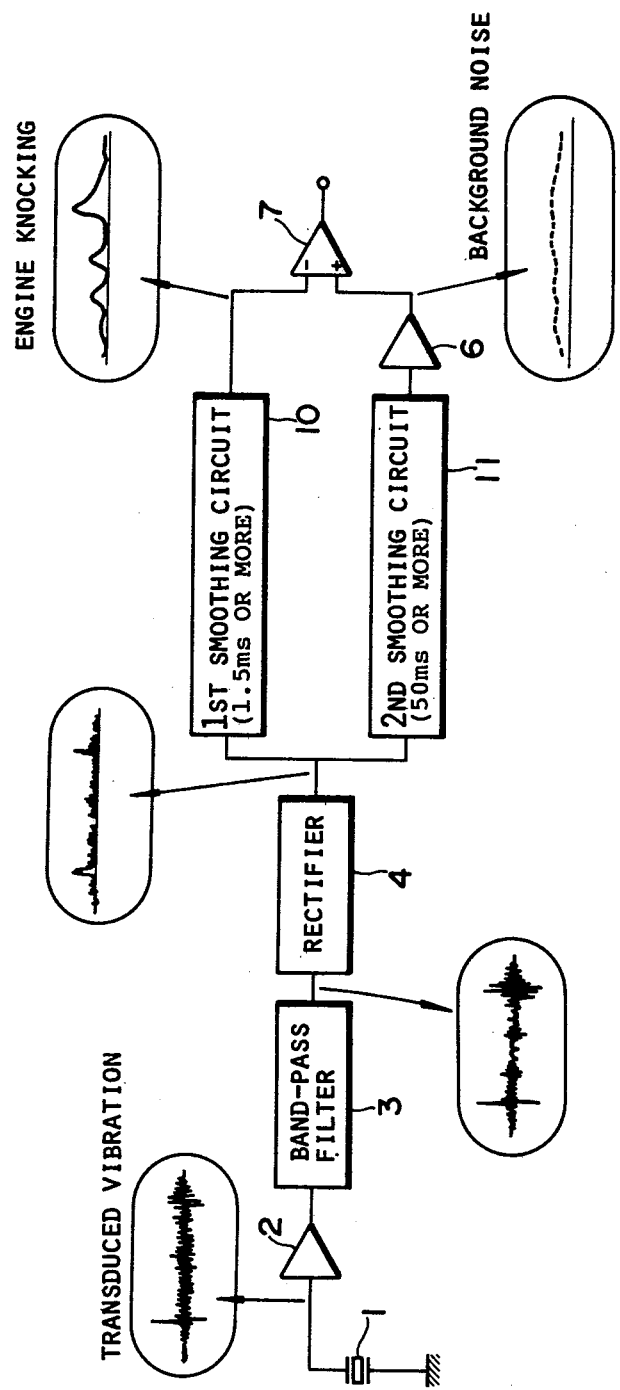

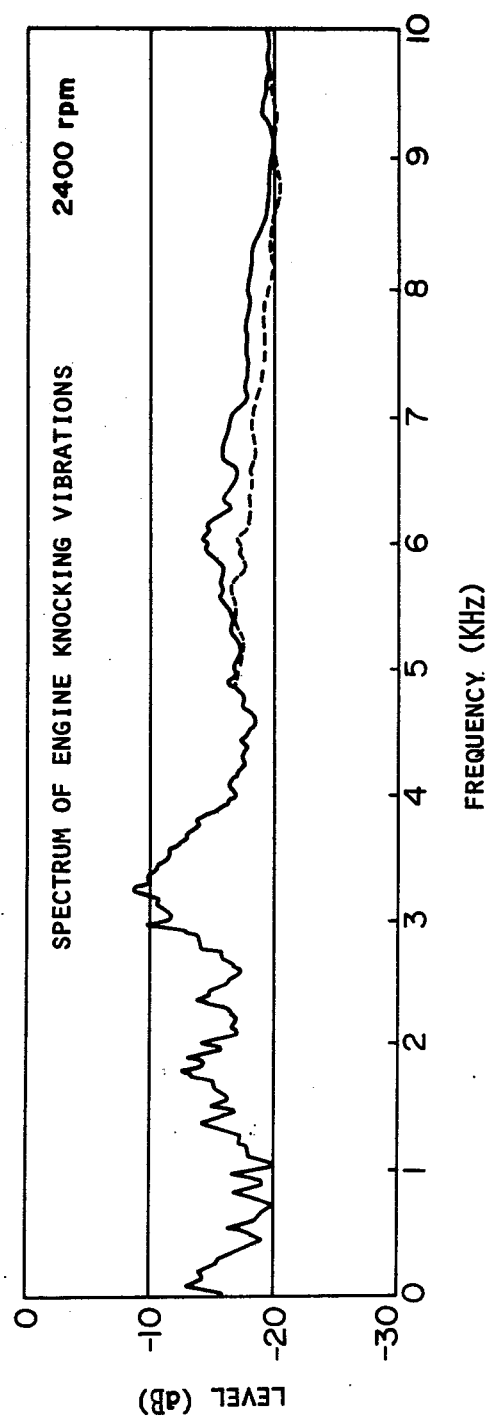

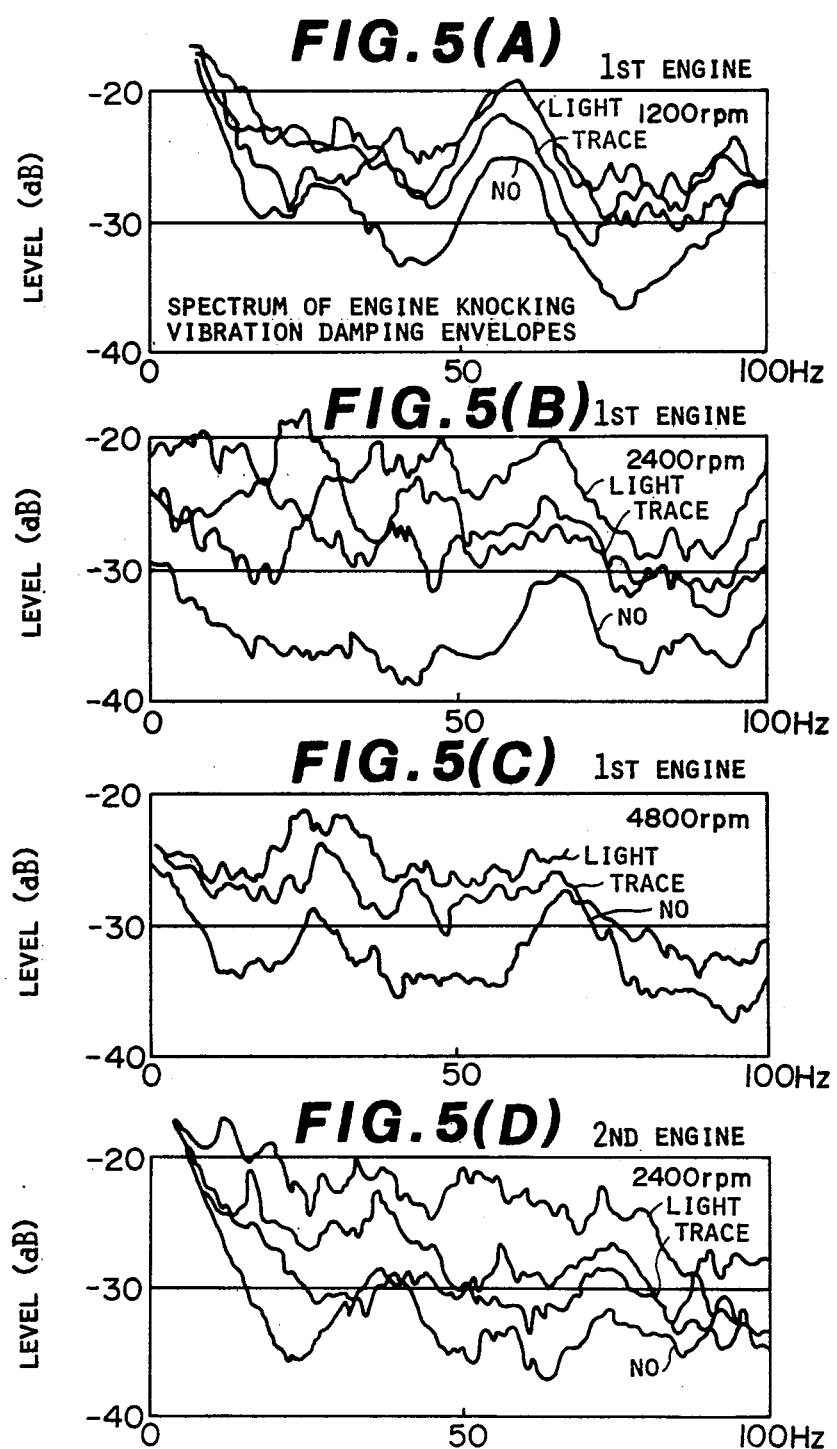

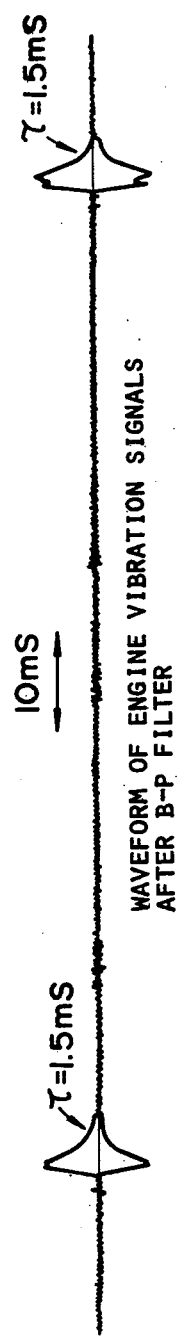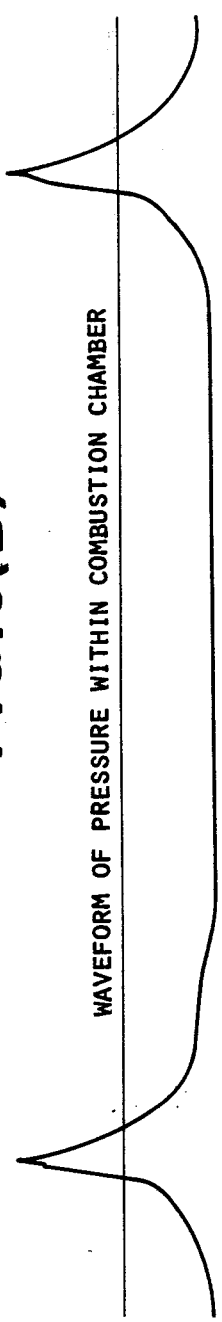
FIG.6(A) WAVEFORM OF ENGINE VIBRATION SIGNALS AFTER B-P FILTER
FIG.6(B) WAVEFORM OF PRESSURE WITHIN COMBUSTION CHAMBER
FIG.6(C) WAVEFORM OF ENGINE VIBRATION SIGNALS AFTER B-P FILTER

ENGINE VIBRATION SIGNALS AFTER B-P FILTER

KNOCKING VIBRATION SIGNALS AFTER 1ST SMOOTHING CIRCUIT (1.5ms)

NOISE SIGNALS AFTER 2ND SMOOTHING CIRCUIT (50ms)

KNOCKING INDICATION SIGNALS

INTEGRATED KNOCKING INDICATION SIGNAL

100mS (1ST ENGINE 2400rpm)

LIGHT

TRACE

NO

FIG.8(B)-1 (2ND ENGINE 2400rpm)

LIGHT

TRACE

NO

FIG.8(C)-1 (1ST ENGINE 1200rpm)
LIGHT
FIG.8(C)-2
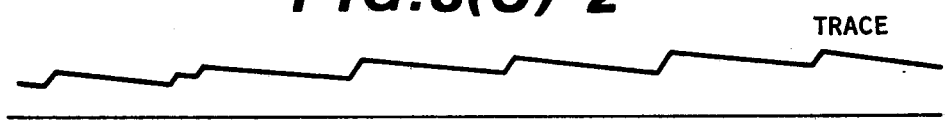
TRACE
FIG.8(C)-3
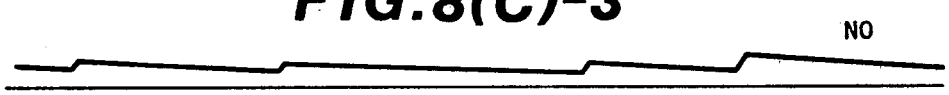
NO
FIG.8(D)-1 (1ST ENGINE 4800rpm)
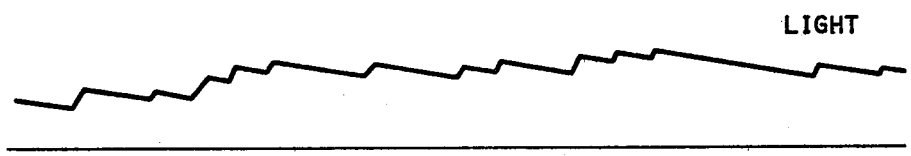
LIGHT
FIG.8(D)-2
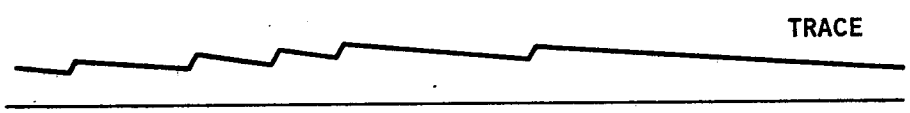
TRACE
FIG.8(D)-3
NO
100mS

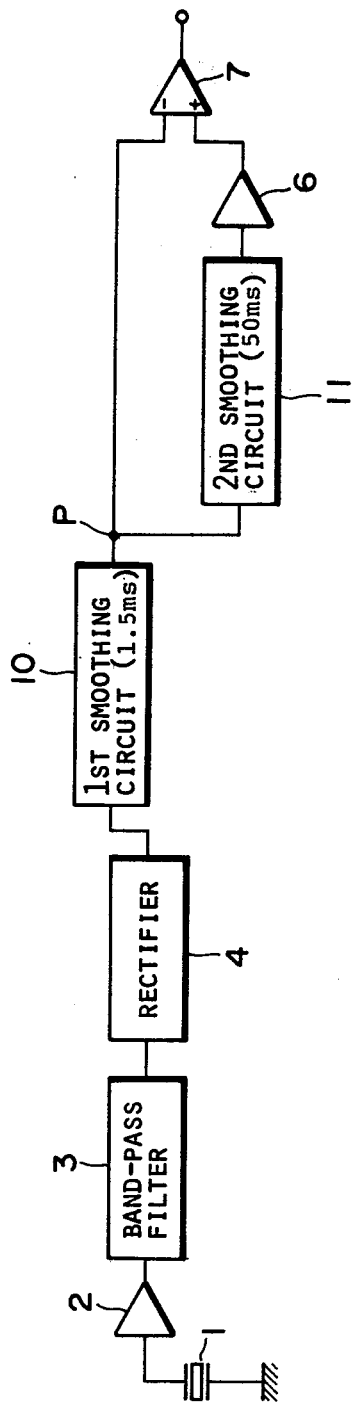

METHOD AND APPARATUS OF DETECTING ENGINE KNOCKING

BACKGROUND OF THE INVENTION

1. Field of the Invention

The present invention relates generally to a method and apparatus for detecting engine knocking, and more particularly to a method and apparatus for detecting engine knocking which can accurately separate engine knocking vibration signals from background noise signals on the basis of waveforms of the detected engine vibration signals.

2. Description of the Prior Art

There are various well-known engine knocking detection methods and apparatus used to detect engine knocking in automotive vehicle engines. In these prior-art engine knocking detection methods and apparatus, conventionally, engine knocking vibration signals are detected by a vibration sensor and filtered through a band-pass filter. After that, the filtered signals are divided into two signals, namely an engine knocking vibration signal and a background noise signal, by rectifying and smoothing the detected vibration signals. These two signals are compared by a comparator in order to determine whether or not engine knocking has occurred.

In prior-art engine knocking detection methods and apparatus, however, since the vibration sensor tends to detect various mechanical vibrations other than engine knocking vibrations and additionally since the smoothing circuit cannot accurately distinguish small engine knocking vibration signals from comparable background noise signals or other mechanical vibration signals, prior-art engine knocking detection methods and apparatus are not sufficiently reliable.

The arrangement and the operation of a prior-art engine knocking detection apparatus will be described in more detail with reference to the attached drawings under DETAILED DESCRIPTION OF THE PREFERRED EMBODIMENTS.

SUMMARY OF THE INVENTION

With these problems in mind, therefore, it is the primary object of the present invention to provide a reliable engine knocking detection method and apparatus which can accurately separate engine knocking vibration signals from background noise signals or other mechanical vibration signals on the basis of the waveforms of the detected engine knocking vibration signals.

To achieve the above-mentioned object, the engine knocking detection method according to the present invention comprises the steps of sensing engine vibrations, filtering the frequency components of the sensed engine vibration signals, rectifying the filtered engine vibration signals, smoothing the signals by averaging its signal level over a lower predetermined time constant representative of the damping envelope of engine knocking vibrations, smoothing the signals by averaging its signal level over an upper predetermined time constant representative of background noise signals, and comparing these two signals to generate a knock indication signal.

To achieve the above-mentioned object, the engine knocking detection apparatus according to the present invention comprises a band-pass filter of from 6 to 9 KHz, a first smoothing circuit which can output only the electric engine vibration signals having envelopes with time constants of 1.5 ms or more, and a second smoothing circuit which can output only the background noise signals having envelopes with time constants or 50 ms or more, in addition to a vibration sensor, amplifiers, a rectifier and a comparator. This is because engine knocking vibration signals have frequency components of from 6 to 9 KHz and time constants of from 1.5 to 50 ms in a damping envelope.

BRIEF DESCRIPTION OF THE DRAWINGS

The features and advantages of the engine knocking detection method and apparatus according to the present invention over the prior-art apparatus will be more clearly appreciated from the following description of the preferred embodiment of the invention taken in conjunction with the accompanying drawings in which like reference numerals designate the same or similar elements or sections throughout the figures thereof and in which, FIG. 1 is a schematic block diagram of an exemplary prior-art engine knocking detection apparatus;

FIG. 2(A) is a graphical representation of the waveforms of engine knocking vibration signals and background noise signals., FIG. 2(B) is a graphical representation of the waveform of engine knocking indication signals;

FIG. 3 is a schematic block diagram of a first embodiment of the engine knocking detection apparatus according to the present invention;

FIG. 4 is a graphical representation of the spectrum of engine knocking vibration signals;

FIG. 5(A) is a graphical representation of the spectrum of engine knocking vibration damping envelopes, obtained when a first engine crankshaft rotates at a speed of 1200 rpm, being classified into three degrees: light knocking, trace knocking and no knocking, FIG. 5(B) is a graphical representation of the spectrum of engine knocking vibration damping envelopes classified into three degrees of knocking severity, obtained when the first engine crankshaft rotates at a speed of 2400 rpm;

FIG. 5(C) is a graphical representation of the same spectrum as in FIG. 5(A) or (B), obtained when the first engine crankshaft rotates at a speed of 4800 rpm;

FIG. 5(D) is a graphical representation of the same spectrum as in FIG. 5(A), (B) or (C), obtained when a second engine crankshaft rotates at a speed of 2400 rpm;

FIG. 6(A) is a graphical representation of the waveform of engine vibration signals obtained after a band-pass filter;

FIG. 6(B) is a graphical representation of the waveform of the pressure generated within a combustion chamber;

FIG. 6(C) is a graphical representation of the waveform of engine vibration signals due to pressure within the combustion chamber obtained after the band-pass filter;

FIGS. 8(A)-1, -2, and -3 are graphical representations of the waveforms of the integrated engine knocking indication signals, obtained when the first engine crankshaft rotates at a speed of 2400 rpm with light engine knocking, trace engine knocking, and no engine knocking, respectively;

FIGS. 8(B)-1, -2 and -3 are graphical representations of the same waveforms as in FIGS. 8(A) above, obtained when the second engine crankshaft rotates at a speed of 2400 rpm;

FIGS. 8(C)-1, -2, and -3 are graphical representation of the same waveforms as in FIGS. 8(A) or (B) above, obtained when the first engine crankshaft rotates at a speed of 1200 rpm;

FIGS. 8(D)-1, -2, and -3 are graphical representation of the same waveforms as in FIGS. 8(A), (B), or (C) above, obtained when the first engine crankshaft rotates at a speed of 4800 rpm; and FIG. 9 is a schematic block diagram of a second embodiment of the engine knocking detection apparatus according to the present invention.

DETAILED DESCRIPTION OF THE PREFERRED EMBODIMENTS

To facilitate understanding of the present invention, a brief reference will be made to a sample prior-art engine knocking detection apparatus, with reference to the attached drawings.

Figures 1, 8A:
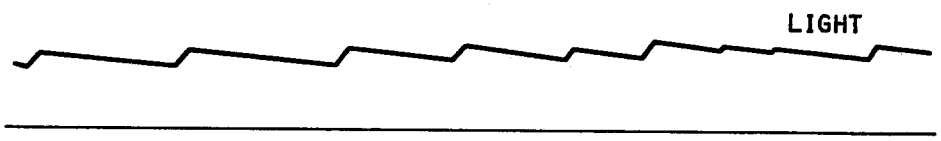

In FIG. 1, the prior-art engine knocking detection apparatus comprises a vibration sensor 1 such as a piezoelectric transducer mounted on an engine block for detecting engine vibrations and transducing the vibrations into the corresponding electrical vibration signals, a buffer amplifier 2 for amplying the transduced electrical vibration signals outputted from the vibration sensor 1, a band-pass filter 3 for passing only the frequency components of engine knocking signals from 6 to 9 KHz (the frequency band of engine knocking signal components), a rectifier 4 for rectifying the engine knocking signals outputted from the band-pass filter 3, a smoothing circuit 5 for smoothing the rectified engine knocking signals, an amplifier 6 for amplifying the smoothed engine knocking signal, that is, the background noise level signal (obtained by rectifying and smoothing the engine knocking vibration signals), and a comparator 7 for comparing the engine knocking vibration signals directly outputted from the band-pass filter 3 with the background noise level signal outputted from the amplifier 6, in order to generate an engine knocking indication signal when the engine knocking vibration signals are higher in voltage level than the background noise level signal. In response to this engine knocking indication signal, the ignition timing of the engine is controlled so as to be delayed appropriately.

Figures 2, 8A:
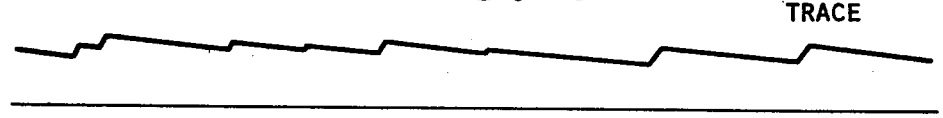

In the prior-art engine knocking detection apparatus, however, as depicted in FIG. 2(A), since the voltage levels a or d representative of various mechanical vibrations other than engine knocking often exceed the background noise signal level or since the voltage levels b or c representative of engine knocking signals often drop lower than the background noise signal level, there exists a problem in that it is impossible to reliably detect only engine knocking vibrations.

Further, FIG. 2(B) shows waveforms of the engine knocking indication signals outputted from the comparator 7 when the engine knocking signal level exceeds the background noise signal level.

In view of the above description, reference is now made to a first embodiment of the engine knocking detection apparatus according to the present invention.

First, the gist of the present invention is as follows: since measurements of engine knocking signals indicate that the time constants of the damping envelopes of engine knocking vibrations lie within the range of from 1.5 ms to 50 ms, the transduced engine knocking vibration signals are first filtered through a band-pass filter in order to select only the signals having frequency components of from 6 to 9 KHz, and next smoothed through two parallel smoothing circuits in order to separate the engine knocking vibration signals having envelopes with time constants of more than 1.5 ms from the background noise signals having envelopes with time constants of more than 50 ms. Further, mechanical vibration signals other than engine knocking signals usually have envelopes with time constants of 1.5 ms or less.

Figures 3, 8A:
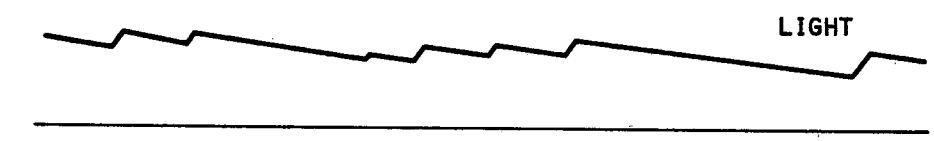

In FIG. 3, the engine knocking detection apparatus according to the present invention comprises a vibration sensor 1, a buffer amplifier 2, a band-pass filter 3, and a rectifier 4, similar to the prior-art apparatus shown in FIG. 1. The band-pass filter passes only frequencies of from 6-9 KHz, because the frequency band of engine knocking vibration components corresponds to this range.

The reference numeral 10 denotes a first smoothing circuit which allows only vibration signals having damping envelopes with time constants of 1.5 ms or more to pass therethrough. Therefore, it is possible to eliminate the vibration signals with time constants of 1.5 ms or less generated by various mechanical phenomena other than engine knocking.

The reference numeral 11 denotes a second smoothing circuit which allows only vibration signals having damping envelopes with time constants of 50 ms or more to pass therethrough. Therefore, it is possible to eliminate engine knocking vibration signals with time constants of from 1.5 to 50 ms, that is, to select only the background noise signals with time constants of 50 ms or more by appropriate smoothing.

These two smoothing circuits are mainly made up of a plurality of condensers and resistors in well-known time-integration circuits.

Further, the reference numeral 6 denotes an amplifier and the reference numeral 7 denotes a comparator, both being similar to the ones used for the prior-art apparatus shown in FIG. 1.

The operation of the first embodiment of the engine knocking detection method and apparatus according to the present invention will be described hereinbelow.

Engine vibration is detected by the vibration sensor 1 and transduced into the corresponding electric vibration signals. The transduced vibration signal is amplified through the amplifier 2 and filtered through the band-pass filter 3 in order to select only the frequency components of engine knocking vibration signals of from 6 to 9 KHz.

After being rectified via the rectifier 4, these filtered and rectified vibration signals are applied in parallel to the first smoothing circuit 10 and the second smoothing circuit 11. Since the first smoothing circuit 10 is so designed as to pass only variations in the signal level with a time constant of more than 1.5 ms, engine knocking vibration signals, free of other mechanical vibrations with time constants of 1.5 ms or less, are outputted from the first smoothing circuit and applied to the negative input terminal of the comparator 7. On the other hand, since the second smoothing circuit 11 is so designed as to pass only variations in signal level with a time constant of more than 50 ms, background noise signals, free of engine knocking vibration signals with time constants of from 1.5 to 50 ms, are outputted from the second smoothing circuit and applied to the positive terminal of the comparator.

The comparator 7 compares the two smoothed signals and outputs an engine knocking indication signal when the engine knocking vibration signals from the first smoothing circuit 10 exceed the background noise signal from the second smoothing circuit 11 in voltage level. In response to this engine knocking indication signal, the ignition timing of an engine is controlled so as to be delayed appropriately.

Now, with reference to graphical representations of various waveforms shown in FIGS. 4-8, a more detailed description of the theory behind the invention will be given below.

FIG. 4 shows the spectrum (frequency components) of engine knocking vibrations. This figure indicates that there are several peaks; however, since large condensers are required to pick up low-frequency signals, the range of from 6 to 9 KHz is used as the representative frequency components of engine knocking vibrations.

FIGS. 5(A)-5(D) show the frequency spectra of engine knocking vibration damping envelopes obtained when a first engine crankshaft rotates at speeds of 1200, 2400, and 4800 rpm and a second engine crankshaft rotates at a speed of 2400 rpm under three different induced-knocking conditions: light knocking, trace knocking and no knocking.

These figures indicate that there exists a difference of approximately 10 dB between the presence and absence of engine knocking in the frequency range of from 0 to 100 Hz. In addition, FIGS. 5(B) and 5(D) indicate that the difference between spectra of the first engine and the second engine is not great, that is, these spectra will be roughly the same in different engines.

In other words, these figures indicate that engine knocking can effectively be detected on the basis of damping envelopes of engine knocking vibrations, and the frequency components of damping envelopes lie in the range of from 0 to 100 Hz.

FIG. 6(A) shows the waveform of engine vibration signals obtained after the band-pass filter 3. FIG. 6(B) shows the waveform of the pressure generated within a combustion chamber (indicator diagram). FIG. 6(C) shows the waveform of engine vibration signals due to the pressure generated within a combustion chamber, which is also obtained after being passed through the band-pass filter 3.

These figure indicate that engine vibration signals due to explosion pressure generated within a combustion chamber have a time constant of about 1.5 ms.

Figure 7A:
FIG. 7(A) is a graphical representation of the waveform of engine vibration signals obtained after the band-pass filter.
Figure 7B:
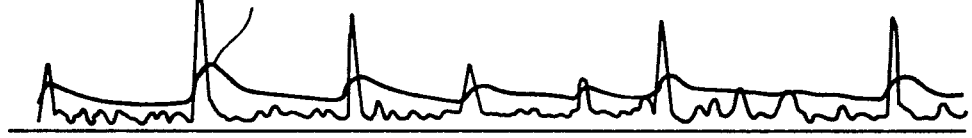
FIG. 7(B) is a graphical representation of the waveforms of engine knocking vibration signals obtained after a first smoothing circuit (1.5 ms) and amplified noise signals obtained after a second smoothing circuit (50 ms)
Figure 7C:
FIG. 7(C) is a graphical representation of the waveform of engine knocking indication signals.
Figure 7D:
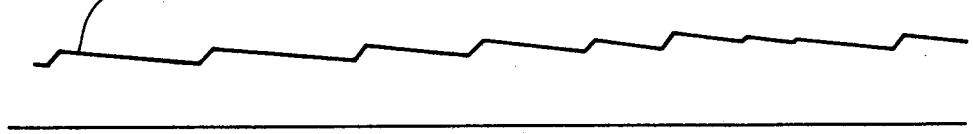
FIG. 7(D) is a graphical representation of the waveform of an integrated engine knocking indication signal.

FIGS. 7(A)-7(D) show various signal waveforms in the first embodiment according to the present invention. FIG. 7(A) shows engine vibration signals including engine knocking signals and background noise, which are obtained after the band-pass filter 3. FIG. 7(B) shows engine knocking vibration signals smoothed after the first smoothing circuit 10 (1.5 ms or more) and background noise signals smoothed by the second smoothing circuit 11 (50 ms or more) and amplified by the amplifier 6. FIG. 7(C) shows knocking indication signals produced by the comparator 7 when the knocking vibration signals exceed the background noise signals. FIG. 7(D) shows an integrated engine knocking indication signal obtained by integrating the knocking indication signals outputted from the comparator 7. Since the width of these knocking indication signals changes in proportion to the intensity of the engine knocking, the amplitude of this integrated engine knocking indication signal represents the intensity of engine knocking.

Figures 2, 8B:
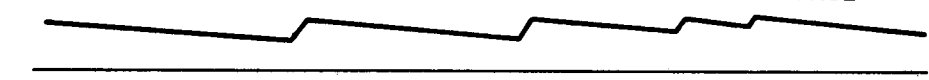
Figures 3, 8B:

FIGS. 8(A)-8(C) show various integrated engine knocking indication signals obtained when a first engine crankshaft rotates at speeds of 1200(C), 2400(A), and 4800(D) and a second engine crankshaft rotates at a speed of 2400(B). These figures indicate that it is possible to detect engine knocking reliably at various degrees of knocking intensity (e.g. light, trace or no knocking) in various engines.

FIG. 9 shows a second embodiment of the engine knocking detection apparatus according to the present invention, in which the second smoothing circuit 11 (50 ms or more) is connected to a point P after the first smoothing circuit 10 (1.5 ms or more). In this embodiment, since the background noise signal is obtained by first eliminating signals with time constants of 1.5 ms or less from the transduced vibration signals via the first smoothing circuit 10 and by secondly eliminating signals with time constants of 50 ms or less from the vibration signals, it is possible to more reliably eliminate spurious mechanical vibrations other than engine knocking, thus ensuring a representative background noise signal.

As described above, in the engine knocking detection apparatus according to the present invention, since all mechanical vibration signals other than engine knocking vibration signals are eliminated by the first smoothing circuit and since high-frequency background noise signals are eliminated by the second smoothing circuit, it is possible to produce accurate engine knocking vibration signals and accurate background noise signals, thus improving the S/N ratio in the transduced vibration signals and increasing the reliability of engine knocking detection.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An engine knocking detection apparatus which comprises:
   (a) a vibration sensor for detecting engine vibrations and transducing the detected engine vibrations into electrical engine vibration signals corresponding thereto;
   (b) a band-pass filter connected to said vibration sensor for attenuating all but a selected range of the frequency components of the transduced engine vibration signals;
   (c) a first smoothing circuit made up of a plurality of condensers and resistors and connected to said band-pass filter for smoothing the resulting engine vibration signals and outputting only the engine vibration signals having damping envelopes with the time constants greater than a lower limit;
   (d) a second smoothing circuit made up of a plurality of condensers and resistors and connected to said band-pass filter in parallel with said first smoothing circuit for smoothing the engine vibration signals and outputting only the engine vibration signals having damping envelopes with time constants greater than an upper limit;

(e) a comparator, one input terminal of which is connected to said first smoothing circuit and the other input terminal of which is connected to said second smoothing circuit, for comparing the amplitude of the engine vibration signals outputted from said first smoothing circuit with the amplitude of the signals outputted from said second smoothing circuit and outputting engine knocking indication signals when the amplitude of the engine vibration signals outputted from said first smoothing circuit exceed that outputted from said second smoothing circuit, whereby engine knocking vibrations with time constants between said lower limit and said upper limit are detected.

2. An engine knocking detection apparatus which comprises:

(a) a vibration sensor for detecting engine vibrations and transducing the detected engine vibrations into engine vibration signals corresponding thereto;

(b) a band-pass filter connected to said vibration sensor for attenuating all but a selected range of frequency components of the transduced engine vibration signals;

(c) a first smoothing circuit made up of a plurality of condensers and resistors and connected to said band-pass filter for smoothing the resulting engine vibration signals and outputting only the engine vibration signals having damping envelopes with time constants greater than a lower limit;

(d) a second smoothing circuit made up of a plurality of condensers and resistors and connected in series to said first smoothing circuit for smoothing the engine vibration signals and outputting only the engine vibration signals having damping envelopes with time constants greater than an upper limit;

(e) a comparator, one input terminal of which is connected to said first smoothing circuit and the other input terminal of which is connected to said second smoothing circuit, for comparing the amplitude of the engine vibration signals outputted from said first smoothing circuit with that outputted from said second smoothing circuit and outputting engine knocking indication signals when the amplitude of the engine vibration signals outputted from said first smoothing circuit exceeds that outputted from said second smoothing circuit, whereby engine knocking vibrations with time constants between said lower limit and said upper limit are detected.

3. An engine knocking detection apparatus as set forth in either claim 1 or 2, wherein said band-pass filter has a pass band of from 6 to 9 KHz in frequency.

4. An engine knocking detection apparatus as set forth in either claim 1 or 2, wherein said first smoothing circuit outputs only engine vibration signals having time constants of 1.5 ms or more.

5. An engine knocking detection apparatus as set forth in either claim 1 or 2, wherein said second smoothing circuit outputs only engine vibration signals having time constants of 50 ms or more.

6. A method for detecting engine knocking in an internal combustion engine, comprising the steps of:

(a) sensing engine vibrations and producing a first signal, the amplitude and frequency of which correspond to the sensed engine vibrations;

(b) filtering the frequency components of said first signal to attenuate all but a 6 to 9 KHz selected range of frequencies representative of engine knocking;

(c) rectifying the filtered first signal to produce a second signal;

(d) smoothing said second signal by averaging its signal level over a lower predetermined time constant of 1.5 ms or more representative of the damping envelope of engine knocking vibrations to produce a third signal;

(e) smoothing said second signal by averaging its signal level over an upper predetermined time constant of 50 ms or more representative of the damping envelope of background engine vibrations to produce a fourth signal; and (f) comparing said third and fourth signals and outputting a knock indication signal when said third signal exceeds the level of said fourth signal.

7. A method for detecting engine knocking in an internal combustion engine, comprising the steps of:

(a) sensing engine vibrations and producing a first signal, the amplitude and frequency of which correspond to the sensed engine vibrations;

(b) filtering the frequency components of said first signal to attenuate all but a 6 to 9 KHz selected range of frequencies representative of engine knocking;

(c) rectifying the filtered first signal to produce a second signal;

(d) smoothing said second signal by averaging its signal level over a lower predetermined time constant of 1.5 ms or more representative of the damping envelope of engine knocking vibrations to produce a third signal;

(e) smoothing said third signal by averaging its signal level over an upper predetermined time constant of 50 ms or more representative of the damping envelope of background engine vibrations to produce a fourth signal; and (f) comparing said third and fourth signals and outputting a knock indication signal when said third signal exceeds the level of said fourth signal.

* * * * *